Dec. 30, 1952  G. W. HORNER ET AL  2,623,569
ANTISKID DEVICE FOR VEHICLE TIRES

Filed Oct. 10, 1949  2 SHEETS—SHEET 1

INVENTORS
GEORGE W. HORNER
WALTER R. ROBERTSON, SR.

BY
ATTORNEY

Dec. 30, 1952    G. W. HORNER ET AL    2,623,569
ANTISKID DEVICE FOR VEHICLE TIRES
Filed Oct. 10, 1949                         2 SHEETS—SHEET 2

*INVENTORS*
GEORGE W. HORNER
WALTER R. ROBERTSON, SR.
BY
ATTORNEY

Patented Dec. 30, 1952

2,623,569

UNITED STATES PATENT OFFICE 2,623,569

ANTISKID DEVICE FOR VEHICLE TIRES

George W. Horner, and Walter R. Robertson, Sr., Idaho Springs, Colo.

Application October 10, 1949, Serial No. 120,492

14 Claims. (Cl. 152—242)

The present invention relates to an anti-skid device for vehicle tires. It has to do particularly, although not exclusively, with anti-skid devices adapted to be applied to the rear wheels of motor vehicles in which the skirts of the rear fenders extend downward considerably below the wheel hubs and rear axle. Moreover, the device of the present invention is particularly well adapted for use in connection with pleasure motor vehicles of current design in which both front and rear fenders have skirt portions which extend below the wheel hubs and, in fact, conceal all but a relatively minor portion of the vehicle wheels such, for example, as the current body styling of the Nash. The present application is a continuation-in-part of our co-pending application Serial No. 27,058, and now Patent No. 2,547,007, issued April 3, 1951.

As is well known, it is virtually impossible to apply an anti-skid chain of conventional design to a mounted tire of a motor vehicle without first jacking up the wheel upon which the tire is mounted. Even when so elevated by a jack, it is difficult to properly apply or install a conventional anti-skid chain to the mounted tire and wheel and adjust it properly to prevent its biting into the tire tread or becoming loose and disengaged entirely, or at least partially, from the tire.

As in the case of our co-pending aforementioned application, it is one of the objects of our present invention to provide a completely new and improved anti-skid device for vehicle tires which may be quickly and easily applied to a mounted tire on a wheel of a vehicle, such as a rear wheel, without necessitating or requiring the jacking up or elevating of the wheel and tire with relation to the road surface.

Another object of the present invention is to provide an improved anti-skid device of the foregoing character in which the inner circumferential member or portion of the device is continuous and forms, when applied to a vehicle tire, a substantially true circle, said inner member being capable, however, of being deformed or spread into substantially an oval shape or condition to permit its ready application to a mounted tire.

A further object of the present invention is to provide an improved anti-skid device for vehicle tires in accordance with the preceding paragraph, in which the inner circumferential side member or portion of the device is composed in part of a relatively inflexible wire or cable portion and in part by a connected flexible portion consisting of a plurality of chain lengths, and in which said inner circumferential side member is provided with a series of closely spaced non-metal sections of tubing, such as rubber, plastic, or synthetic rubber tubing, which tubing facilitates the application of the device to the mounted tire and which contacts the inner side wall of the tire after the device has been installed to thus prevent any damage to said side wall during use.

Another and important object of the present invention is to provide an improved device as aforesaid, in which the device includes a plurality of cross chains which connect together an outer circumferential side chain of conventional type and an improved inner circumferential member or portion of the character mentioned above, in which the cross chains are provided with inner hook-like members for engagement with the inner specially formed circumferential member which are substantially smaller than the corresponding outer hook-like members which engage the outer circumferential conventional side chain, said circumferentially smaller hook-like members serving to materially reduce the possibility of wear upon the inner wall of the tire.

The foregoing and other objects and advantages of the present invention will appear from the following description and appended claims when considered in connection with the accompanying drawings forming a part of this specification wherein like reference characters designate corresponding parts in the several views.

Figures 2, 3:
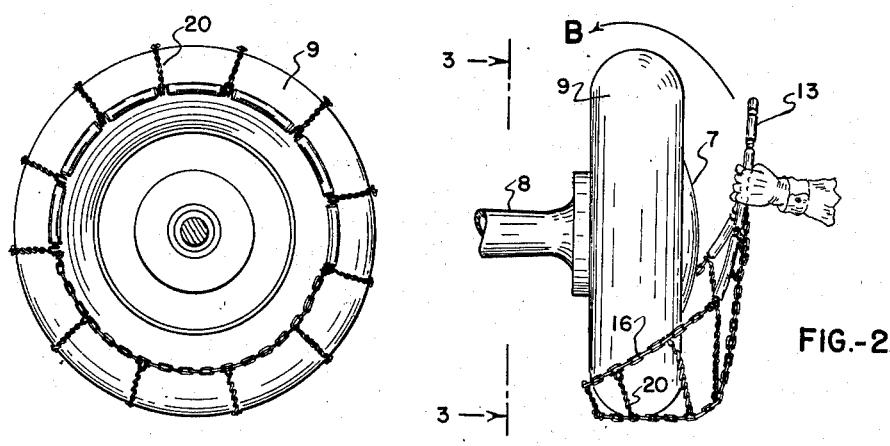
Fig. 2 is a fragmentary rear end elevational view of a right rear tire and wheel and a portion of the vehicle rear axle, illustrating one position of the parts and one step in the operation of installing the anti-skid device of the present invention upon said tire.
Figure 4:
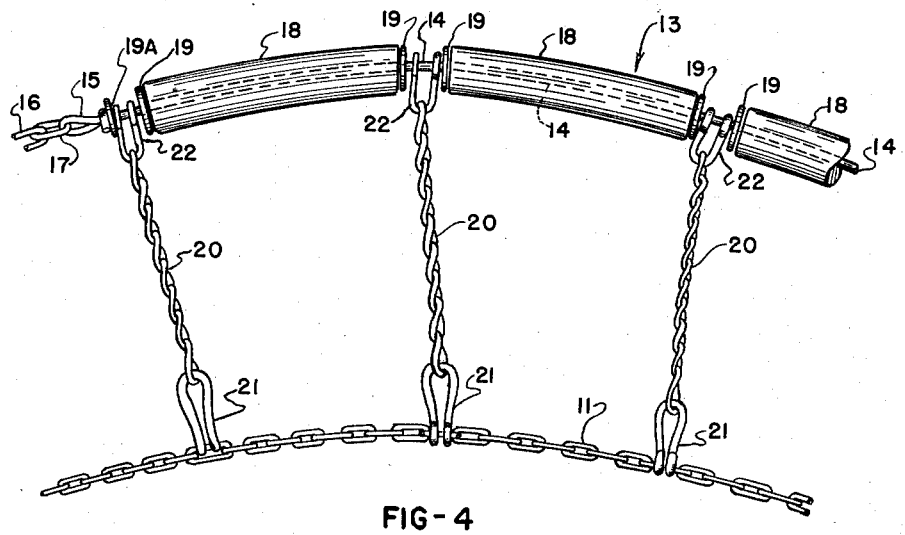
Figure 5:
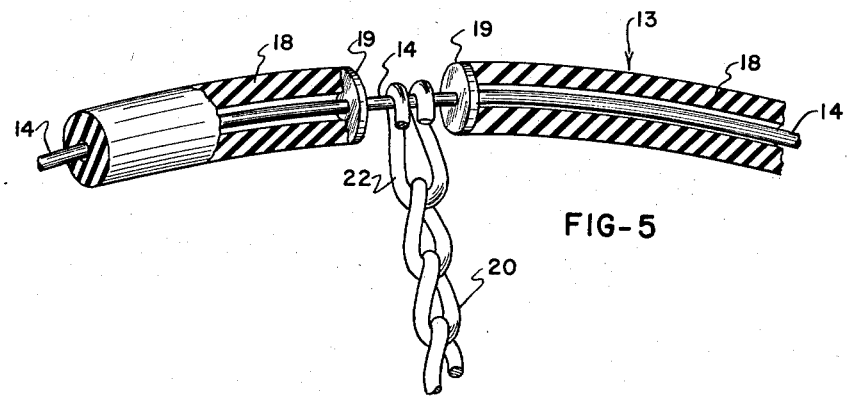
Figure 6:
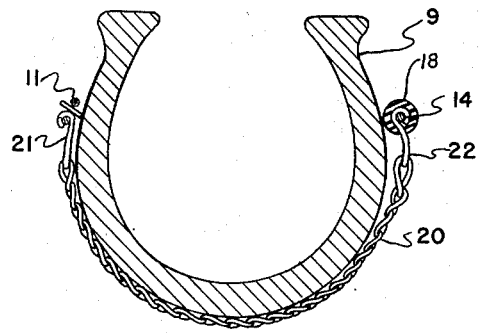

Fig. 3 is an elevational view, taken substantially along the line 3—3 of Fig. 2, looking in the direction of the arrows and showing the anti-skid device of the present invention after it has been properly installed upon the tire of Fig. 2, and illustrating the flatwise manner in which the inside hook-like members of the cross chains and the inner specially formed circumferential side member rest against the inner side wall of the tire;

Fig. 4 is an enlarged fragmentary top plan view of a length or section of the anti-skid device shown in the preceding figures;

Fig. 5 is a fragmentary detail perspective view, partly in section, illustrating details of a portion of the inflexible part or member of the specially formed inner circumferential side member of the anti-skid device; and Fig. 6 is a vertical transverse section through an unmounted tire illustrating the relationship of a cross chain member and the inner and outer circumferential side members of the anti-skid device of the present invention, to the tire when installed upon said tire.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Figure 1:
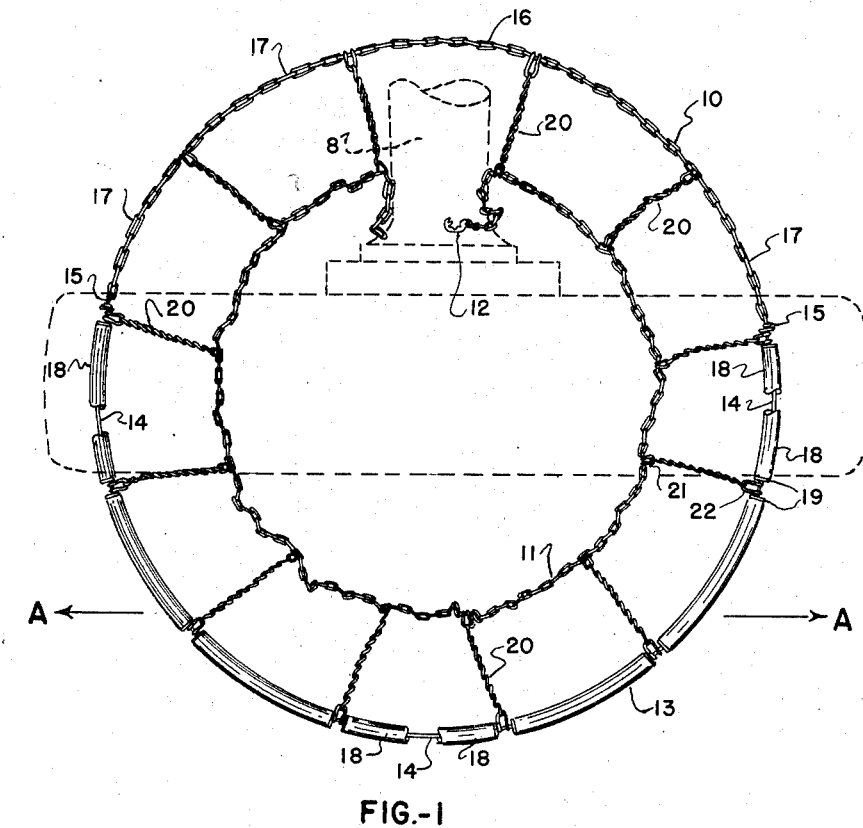
Fig. 1 is a top plan view of an embodiment of the present invention and showing the improved anti-skid device of said invention in position upon the ground or floor surface with relation to a tire and vehicle rear axle prior to its installation upon the tire.

Referring now particularly to Fig. 1 of the drawings, there is shown as a whole at 10 one of the anti-skid devices for vehicle tires embodying the present invention. In this figure, the device is shown in its normally circular shape supposedly resting upon the surface of the ground and being disposed in relation to the rear axle 8 of a vehicle and the right rear tire 9 mounted upon the right rear wheel, such as the wheel indicated at 7 in Fig. 2.

The anti-skid device 10 comprises, as shown, an ordinary or conventional outer circumferential side chain member 11 having a conventional chain-end fastening device 12, see Fig. 1. In lieu of the conventional inner circumferential side chain, however, there is provided a new and improved inner circumferential member, shown as a whole at 13. This member, as shown, entirely supplants the conventional inner circumferential side chain of a conventional anti-skid device and comprises, preferably, a part or portion 14 of generally semi-circular shape which may be formed from relatively heavy gauge wire or which may, if desired, be formed from a length of suitable cable. This section or portion 14, regardless of the kind of material from which it is made, is preferably relatively inflexible and is also preferably of a length so as to extend somewhat beyond 180° of a circle, preferably approximately 210° of a circle or annular ring-like member. The opposite ends of the inflexible member 14 are preferably looped at 15, see particularly Fig. 4.

The other part, section, or portion of the inner circumferential member 13 is preferably a flexible member or portion such, for example, as the length of interconnected tire chain links, shown as a whole at 16. As shown, the flexible member or portion 16 is formed from a series or plurality of interconnected tire chain links, the individual links being indicated at 17. The opposite ends of member 16 are engaged with the loops 15 of inflexible member 13. The length of interconnected chain 16 extends approximately 150° of a circle, being connected, as stated, to the ends 15 of the approximately 210° length of wire, cable, or the like 14. In other words, when laid flat upon the ground as indicated in Fig. 1 of the drawings, the inner circumferential member comprising the parts or sections 13 and 16, forms a complete ring-like member or circle of 360°. It is to be understood, however, that the inner circumferential member composed of the parts 13 and 16 may be spread out at the points of connection 15, 15 into substantially an oval shape when the portion 13 adjacent its opposite ends is grasped by the hands, as indicated in Fig. 2.

It is desirable that the length or portion of chain or other flexible material 16 be approximately the same length as the outside or over-all diameter of the vehicle tire upon which the anti-skid device is to be mounted. Thus the length of the flexible member 16 determines the length of the inflexible member 14. By employing the proper length for the respective members or portions 16 and 14, the anti-skid device may be easily and quickly mounted upon a tire without any binding action which would be the case if the length or section of chain 16 were not the proper length.

As clearly shown in the drawings, the inflexible member or length of wire, cable, or the like 14 has telescoped over it a plurality of preferably tubular or sleeve-like non-metallic members 18. Also telescoped over member 14 and providing bearing washers or disks for the ends of the non-metallic sleeve members 18, are the metallic bearing disks or washers 19.

With particular reference to Fig. 4 of the drawings, it will be noted that each of the sleeve-like members 18 has a pair of washers 19 which are disposed at its opposite ends. These members 18 and 19 are substantially like those of our aforementioned co-pending application, adjacent pairs of the perforated disks or washers 19 for each member of the pair being disposed at opposite sides of hook-like members on the inside ends of the anti-skid device cross chain members as will be presently described and as is clearly illustrated particularly in Figs. 4 and 5 of the drawings.

The specially formed inner circumferential side member 13, 16 and the conventional outer circumferential side chain 11 are connected together at spaced intervals by means of cross chains 20. Each of the cross chains 20 carries at its outer end a hook-like member 21 of conventional form and size, which member is engaged with and clamped to one of the links of the conventional outer side chain 11. The opposite or inner end of each of the cross chains 16 is, however, provided with a relatively smaller hook-like member 22 which is engaged with the specially formed inner circumferential member 13, 16 of the anti-skid device of the present invention.

As clearly seen in Figs. 4 and 5 of the drawings, certain of the smaller hook-like members 22 are engaged with the inflexible part or portion of the inner circumferential member, namely the wire or cable 14, these hook-like members 22 being preferably disposed between pairs of bearing washers 19. Other small hook-like members 22 also carried by the inner ends of cross chains 20 are engaged with individual links 17 of the flexible part or portion 16 of the inner circumferential member.

Thus, the inner ends of cross chains 20 are likewise connected to the inner member at spaced intervals throughout the length of said inner member. Whereas the hook-like members 20 which are engaged with the individual links 17 of the flexible portion of the inside circumferential member can not shift lengthwise of said member, the other smaller hook-like members 22 which are engaged with the relatively inflexible member 14 are capable of relatively sliding movement on said member, as will be readily understood by viewing Figs. 4 and 5 of the drawings.

The washers 19 may be of the same size throughout, although, if desired, the washer adjacent each hook or looped end 15 of member 14 may be somewhat smaller in diameter than the remaining washers, as shown at 19a in Fig. 4.

Although the tubular members 18 may be formed of any suitable or desirable non-metallic material, they are preferably formed from relatively tough rubber or from synthetic rubber, although plastic of some suitable type may be employed. These members 18 serve the purpose of providing frictionless means or members for engaging the surfaces of the tire as the anti-skid device is being applied to the tire, as indicated in Fig. 2 of the drawings. They also provide non-metallic surfaces to reduce any possible wear upon the inner side wall of tire 9 after the device has been installed or mounted upon the tire, as indicated in Fig. 3 of the drawings.

The metallic washers 19, arranged in pairs as stated above, serve as wear plates or members to prevent the hook-like members or ends 22 of the cross chains 20 from damaging or causing wear upon the ends of the non-metallic sleeve members 18. This problem of preventing wear is not, of course, present where other hook-like members 22 engage the individual links 17 of the flexible portion 16 of the inner specially formed circumferential member of the device.

Since the greatest strain and thus possible wear is usually exerted upon the inner side wall of a tire having an anti-skid chain or device mounted thereupon, it is particularly desirable that the relatively smaller hook-like members 22 be employed instead of the usual relatively larger hook-like members, such as those indicated at 21 in the drawings, which latter are connected to the conventional outer side chain member 11.

In applying the anti-skid device of the present invention to a tire mounted upon the wheel of a vehicle, such as the right rear wheel shown in the drawings, the entire device is preferably first laid flat upon the ground surface, as indicated in Fig. 1. The vehicle is then backed or otherwise moved into position so that the right rear wheel 7 and tire 9 will be disposed over the device, as indicated by the broken lines in Fig. 1. It is to be noted that in this position, the open ends of the conventional outer side chain member 11, carrying the fastening device 12, may be disposed beneath the rear axle 8 and that the inflexible part or portion 13 of the specially formed inner circumferential member is at the outside of the wheel and tire, with the flexible part or portion 16 thereof disposed inside the wheel. It will be understood that the tread portion of tire 9 which contacts the ground surface will actually be disposed within the circle formed by the conventional side chain member 11, as viewed in Fig. 1 of the drawings.

With the parts in position in which they are shown in Fig. 1, the operator preferably grasps portion or section 13 of the inner circumferential member adjacent its ends, as indicated in Fig. 2, and moves the inflexible portion 13 outwardly in opposite directions, as indicated by the arrows A in Fig. 1. This causes the entire anti-skid device to assume a generally oval shape or formation (not shown) lengthwise of the wheel and tire. The inflexible portion or section 13 being so grasped by the hands of the person applying the device, only the left hand of said person being shown in Fig. 2, the entire device may be pulled outwardly and elevated vertically, as seen in Fig. 2, with the inflexible section or portion 13 thereof being lifted over tire 9 in the direction of arrow B in Fig. 2.

The break in the conventional outer side chain 11 has permitted the side chain to be spread and the device to be moved into its oval form. This makes it considerably easier to shift the entire device from its position upon the ground into its engaging position with tire 9, as seen in Fig. 3. When so applied, it will be seen that the specially formed, preferably two-sectioned inner circumferential member 13, 16 of the device is disposed inside of the tire and may rest against the inside wall of said tire. The outer circumferential and more or less conventional side chain 11 is disposed against the outer wall of tire 9. The ends of this side chain 11 are then brought together and fastened by the fastening device or clamp 12 of Fig. 1.

It will be seen that it is absolutely unnecessary, in the operation of installing the improved anti-skid device of the present invention, to reach inside the wheel or tire when applying said device to the tire. This is eliminated by the fact that the inner specially formed circumferential member 13, 16 is continuous and thus requires no fastening device, and by the fact that the necessary and conventional fastening device 12 is disposed at the outside of the tire and wheel in easy reach of the person applying the device.

When it is desired to remove the anti-skid device from tire 9, the operation above described is substantially reversed after, of course, releasing the fastening device 12 to permit the sectioned portion of the device to be lifted and moved over the top of the tire and returned to substantially its original or starting position flat upon the ground surface, as indicated in Fig. 1 of the drawings. The vehicle is then moved so that the tire 9 is no longer disposed within the circle defined by the outer conventional side chain 11. The device is now free to be picked up and placed, if desired, in the rear deck or trunk of the vehicle for future use.

Variations of the structure defined above and claimed hereinafter may, of course, be employed within the scope and meaning of the present invention, so long as the specially formed inner circumferential side member, such as member 13, 16, is composed of a substantially inflexible portion or part and an attached flexible portion or part. The inflexible wire or cable 14, while shown as being somewhat greater in length than one-half of a circle, may be varied in length, as desired. This section 13 and the attached section 16 may, if desired, be of equal length; or, if desired, the flexible section 16 may be of greater length than the inflexible section 13 to which it is attached. At the moment, however, it seems desirable to provide the greater length, approximately 210° of a circle, to the substantially inflexible member.

It may be desirable to provide an inner circumferential member to supplant member 13, 16, which is in the form of a flexible cable made of fine wires, which cable is preferably of one-quarter inch or three-eighths inch diameter, and which forms a continuous circle by being secured together at its meeting ends in any suitable manner, as by welding. This circumferential cable member will be attached to the outer circumferential chain, such as chain 11, by the usual cross chain members, such as members 20, with relatively small hook-like members at their inner ends and larger or conventional hook-like members at their outer ends. If desirable, the cable may be provided with a plurality of non-metallic tubes or sleeve-like members, similar to the members 18. A series or plurality of such members may extend around the entire circle formed by the cable; they may be provided only on a portion of the length of the cable; or they may be omitted entirely. If non-metallic members, similar to members 18 are employed, they will be bounded at their outer ends by bearing washers or perforated disks, such as those shown at 19.

We claim:

1. An anti-skid device for vehicle tires, comprising an outer circumferential side chain having a releasable fastener at its separable ends, a plurality of cross chains movably attached at spaced points to the outer circumferential side chain, and an inner circumferential member attached at spaced points to the opposite ends of the cross chains, said inner circumferential member including a length of wire or cable and a length of interconnected chain links together normally forming a circle when the anti-skid device is installed upon a vehicle tire, and a plurality of spaced rubber tubes telescoped over the length of wire and having metallic bearing washers at their opposite ends.

2. An anti-skid device for vehicle tires according to claim 1, wherein the cross chains have hook-like members at their opposite ends in which the hook-like members which engage the inner circumferential member are relatively smaller than the hook-like members which engage the outer circumferential side chain.

3. An anti-skid device for vehicle tires according to claim 1, wherein the ends of the cross chains which engage the length of wire and plurality of interconnected chain links forming the inner circumferential member are disposed between bottom pairs of bearing washers and rubber tube ends.

4. An anti-skid device for vehicle tires, comprising an outer circumferential side chain composed of a plurality of links and a fastener for the separable ends of said side chain, an inner circumferential member comprising a substantially semi-circular length of wire or cable and a plurality of interconnected chain links connecting the ends of the substantially semi-circular wire together, a series of non-metallic spaced sleeves telescoped over said wire, pairs of metallic bearing washers associated with the ends of the non-metallic sleeves, said length of wire and said interconnected chain links attached to the ends thereof and said spaced sleeves extending substantially continuously, and a plurality of cross chains interconnecting the outer circumferential side chain and the inner circumferential member, said cross chains each having hook-like members at their opposite ends for engagement with the outer side chain and the inner circumferential member, said hook-like members engaging the inner circumferential member at spaced points and between the pairs of washers.

5. An anti-skid device according to claim 4, wherein the substantially semi-circular section of wire and the connected chain links forming the inner circumferential member of the device normally remain in a circle when installed upon a tire.

6. An anti-skid device according to claim 4, wherein the hook-like members of the cross chains which engage the outer circumferential side chain are relatively larger and heavier than the hook-like members at the opposite ends of the cross chains.

7. An anti-skid device for vehicle tires according to claim 4, wherein hook-like members are engaged with the inner circumferential member at points located between substantially every pair of non-metallic sleeves and metal washers.

8. An anti-skid device according to claim 4, wherein the non-metallic sleeves are formed from rubber.

9. An anti-skid device according to claim 4, wherein hook-like members are engaged with the inner circumferential member at points located between substantially every pair of spaced rubber sleeves and metallic washers.

10. An anti-skid device according to claim 4, wherein the inner circumferential member forms a circle of 360°, and wherein the length of wire forming a part of the inner circumferential member extends throughout approximately 210° of said circle.

11. An anti-skid device according to claim 4, wherein the length of wire forming a part of the inner circumferential member of the device represents a minimum of 180° of a circle.

12. An anti-skid device for vehicle tires, comprising an outer circumferential conventional side chain having a releasable fastener at its separable ends, a plurality of cross chains movably attached at spaced points to the outer circumferential side chain, and an inner circumferential member attached at spaced points to the opposite ends of the cross chains, said inner circumferential member being composed in part of a relatively inflexible portion and in part by a connected flexible portion, said portions together normally forming a circle when the device is in operative position upon a vehicle tire, said inflexible portion of the inner circumferential member having telescoped thereover a plurality of spaced rubber tubes and metallic bearing washers disposed at their opposite ends.

13. An anti-skid device for vehicle tires, comprising an outer circumferential slide chain composed of a plurality of links and a fastener for the separable ends of said side chain, an inner circumferential member comprising a substantially semi-circular length of wire or cable and a plurality of interconnected chain links connecting the ends of the substantially semi-circular wire together, a series of spaced synthetic rubber sleeves telescoped over said wire, pairs of metallic bearing washers associated with the ends of the synthetic rubber sleeves, said length of wire and said interconnected chain links attached to the ends thereof and said spaced sleeves extending substantially continuously, and a plurality of cross chains interconnecting the outer circumferential side chain and the inner circumferential member, said cross chains each having hook-like members at their opposite ends for engagement with the outer side chain and the inner circumferential member, said hook-like members engaging the inner circumferential member at spaced points and between the pairs of washers.

14. An anti-skid device for vehicle tires, comprising an outer circumferential side chain having a releasable fastener at its separable ends, a plurality of cross chains movably attached at spaced points to the outer circumferential side chain, and an inner circumferential member attached at spaced points to the opposite ends of the cross chains, said inner circumferential member including a length of wire or cable and a length of interconnected chain links together normally forming a circle when the anti-skid device is installed upon a vehicle tire, and a plurality of spaced flexible tubes telescoped over the length of wire and being separated by and in contact with the adjacent end portions of said cross chains and providing a substantially continuous non-metallic circumferential surface throughout substantially the length of the wire or cable of the inner circumferential member.

GEORGE W. HORNER.
WALTER R. ROBERTSON, Sr.

REFERENCES CITED

The following references are of record in the file of this patent:

UNITED STATES PATENTS

| Number | Name | Date |
| --- | --- | --- |
| 913,674 | Shattuck | Feb. 23, 1909 |
| 1,293,424 | Hartung | Feb. 4, 1919 |
| 1,989,217 | Sisk | Jan. 29, 1935 |
| 2,192,227 | Hill | Mar. 5, 1940 |
| 2,328,808 | Holtz | Sept. 7, 1943 |
| 2,427,973 | Merritt | Sept. 23, 1947 |

FOREIGN PATENTS

| Number | Country | Date |
| --- | --- | --- |
| 13,867/33 | Australia | Mar. 15, 1934 |